(12) United States Patent
Chen et al.

(10) Patent No.: US 8,671,134 B2
(45) Date of Patent: Mar. 11, 2014

(54) METHOD AND SYSTEM FOR DATA DISTRIBUTION IN HIGH PERFORMANCE COMPUTING CLUSTER

(75) Inventors: Qi Chen, Beijing (CN); Jun He, Beijing (CN); Guang Lei Li, Beijing (CN); Huo Ding Li, Beijing (CN); Wei Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 12/955,280

(22) Filed: Nov. 29, 2010

(65) Prior Publication Data

US 2011/0138396 A1  Jun. 9, 2011

(30) Foreign Application Priority Data

Nov. 30, 2009 (CN) .......................... 2009 1 0225838

(51) Int. Cl.
*G06F 15/16* (2006.01)
*G06F 7/00* (2006.01)
*G06F 9/46* (2006.01)

(52) U.S. Cl.
USPC ........... 709/201; 709/203; 709/205; 709/231; 707/764; 718/100; 718/105

(58) Field of Classification Search
USPC .................. 709/201, 223, 224, 238; 718/105
See application file for complete search history.

(56) References Cited

U.S. PATENT DOCUMENTS 7,240,107 B2  7/2007  Chase-Salerno et al.
7,412,537 B2  8/2008  Holt et al.
(Continued)

OTHER PUBLICATIONS

C Jeffords et al., "Building High Performance Clusters", published on-line at www.drdobbs.com/building-high-performance-clusters/184406039, also at www.ddj.com/architect184406039 (Apr. 2005).

(Continued)

*Primary Examiner* — Yemane Mesfin
*Assistant Examiner* — Peter Chen
(74) *Attorney, Agent, or Firm* — Grant A. Johnson; Roy W. Truelson

(57) ABSTRACT

Specified data is distributed in a High-Performance Computing cluster comprising a Management node and M computation nodes where M is an integer greater than one, by the method comprising: dividing the M computation nodes into m layers where m is an integer greater than one; dividing the specified data into k shares where k is an integer greater than one; distributing, by the Management node, the k shares of data to a first layer of computation nodes as sub-nodes thereof, each node of the first layer obtaining at least one share of data therein; distributing, by each of the computation nodes, the share(s) of data distributed by a parent node thereof to sub-nodes thereof; and requesting, by each of the computation nodes, the remaining specified data to other computation nodes, to thereby obtain all the specified data.

26 Claims, 4 Drawing Sheets

● Management node
◉ First layer of computation nodes
○ Second layer of computation nodes
▬▬▶ Data streams between computation nodes

(56) References Cited

U.S. PATENT DOCUMENTS

| | | |
|---|---|---|
| 7,552,233 B2* | 6/2009 | Raju et al. .................... 709/238 |
| 8,279,766 B2* | 10/2012 | Tsang et al. ................... 370/252 |
| 2002/0169833 A1* | 11/2002 | Tani et al. ..................... 709/205 |
| 2003/0031176 A1* | 2/2003 | Sim ............................... 370/392 |
| 2003/0167295 A1 | 9/2003 | Choo |
| 2004/0143672 A1* | 7/2004 | Padmanabham et al. ..... 709/231 |
| 2007/0233870 A1* | 10/2007 | Goto et al. .................... 709/226 |
| 2009/0003344 A1 | 1/2009 | Kumar |
| 2009/0006808 A1 | 1/2009 | Blumrich et al. |
| 2009/0041459 A1 | 2/2009 | Dress et al. |
| 2009/0055625 A1 | 2/2009 | Howard et al. |
| 2009/0094605 A1* | 4/2009 | Brelsford et al. ............. 718/100 |
| 2010/0094972 A1* | 4/2010 | Zuckerman et al. .......... 709/219 |
| 2011/0173265 A1* | 7/2011 | Liang et al. ................... 709/205 |

OTHER PUBLICATIONS

S. Hariri et al., "Communication System for High-performance Distributed Computing", Concurrency: Practice and Experieince, vol. 6(4), 251-270 (Jun. 1994), published on-line at www3.interscience.wiley.com/journal/113441278/abstract?CRETRY=1&STRETRY=0.

J. Brunet, et al., "All-To-All Broadcast and Applications on the Connection Machine", Parallel Computing Research Group, Center for Research in Computing Technology, Harvard University (1991), published in International Journal of High Performance Computing Applications, vol. 6, No. 3, 241-256 (1992).

* cited by examiner

● Management node
◉ First layer of computation nodes
○ Second layer of computation nodes
⟶ Data streams between computation nodes

METHOD AND SYSTEM FOR DATA DISTRIBUTION IN HIGH PERFORMANCE COMPUTING CLUSTER

TECHNICAL FIELD

The present invention generally relates to a computer field, and more specifically, to a method and system for data distribution in a high-performance computing cluster.

DESCRIPTION OF THE RELATED ART

A computer cluster, briefly referred to as cluster, is a computer system which connects a plurality of computers (also called computing nodes, e.g. software and/or hardware resources) together to cooperate for computing large scale tasks. These computing nodes are usually located in the same managing domain, have unified managing policies and provide services to users as a whole. A single computer in the cluster system is often called a node. The cluster system has many advantages. For example, when the cluster system operates in manner of load balance, it performs the same job through a plurality of computers and thus can be faster in computing and lower in energy consumption.

High-Performance Computing is a branch of the computer science, and it aims at developing supercomputer for the task that can not be handled by a single computer, studying parallel algorithms and developing relevant software. Matters primarily studied by High-Performance Computing include: large scale scientific matters such as weather forecast, topographic analysis and biological medical preparation; and storage and processing of mass data, such as data mining, image processing and gene sequencing. High-Performance Computing cluster, just as the name implies, is to study High-Performance Computing by using cluster techniques.

High-Performance Computing generally divides a task into several parallel sub-tasks which cooperate with each other to perform the computation. In a High-Performance Computing cluster, there are a large scale computing nodes, for example, one IBM cluster comprises more than 16000 nodes. There are several management nodes and a plurality of computation nodes in the High-Performance Computing cluster. The management nodes are responsible for interacting with the users, controlling and managing information, allocating computing resources and scheduling sub-tasks. Connection information of all the nodes in the High-Performance Computing cluster is collected and stored in the management nodes. When the High-Performance Computing cluster receives a task, the management nodes first allocate computing resources in the cluster and then assign the resources for the task, i.e. dividing the task into a plurality of sub-tasks, looking for a proper computation node for each sub-task and constructing a network connection table for the job, the network connection table holds the connection information of network connection, such as Infiniband of each task. When a sub-task in the High-Performance Computing communicates with another sub-task therein, the sub-task must fetch the connection information of the another sub-task. The information is similar to an IP address plus port number in the network protocols. Therefore, for a large scale task, e.g. a task having one million sub-tasks, the entire network connection information table includes one million items each corresponding to one sub-task. For Infiniband, each item at least includes the following information: adapter address, window ID, network_id, logical_id, LID mask controlled mask, port_id. Each item has a size of about 50 bytes, so a network connection table required by all the one million sub-tasks is about 50 MB.

Subsequently, the management node establishes connections with all the computation nodes serving the tasks to deliver the computing tasks; during the delivery of the tasks, the management node needs to deliver a lot of information, one of which is the network connection table, whereby the computation nodes can connect with each other and exchange data. FIG. 1 is a schematic view showing data distribution in the prior art in a High-Performance Computing cluster. As shown in FIG. 1, in the High-Performance Computing cluster, the computation nodes are divided into two layers, wherein the management node delivers the network connection table of the job to a first layer of computation nodes, and then the first layer of computation nodes deliver the network connection table of the job to a second layer of computation nodes; after every computation node receives the network connection table of the job, it sends a notification to the management node, and after the management nodes receive the confirmations on the network connection table from all the computation nodes as well as other relevant information of all the computation nodes, it instructs all the computation nodes to start the computing sub-tasks.

Many High-Performance Computing jobs use almost all the nodes in the High-Performance Computing cluster, and the nodes interact densely with each other. For example, for the High-Performance Computing cluster using 128*128 nodes in FIG. 1, if the size of the network connection table is 50 M bytes, two layers of computation nodes are used and the network bandwidth is 10 G, then it needs a transmission time of $(50\ M*128*128)/(10\ G/8)=10$ seconds to deliver the network connection table only from the management node to all the computation nodes. A period of time from the moment when the Management node assigns resources for a job to the moment when the computation nodes start computing for the job is called a job activation time. Apparently, using a too long period of time for transmitting the network connection table of a job will cause a too long job activation time.

SUMMARY OF THE INVENTION

In order to overcome the problem in the prior art, the present invention proposes a method and system for data distribution in the High-Performance Computing cluster.

According to one aspect of the present invention, a method for distributing specified data in a High-Performance Computing cluster is provided, the High-Performance Computing cluster comprising a management node and M computation nodes where M is an integer greater than or equal to 2, the management node distributing the specified data to the M computation nodes, the method comprising:
 dividing the M computation nodes into m layers where m is an integer greater than or equal to 2;
 dividing the specified data into k shares where k is an integer greater than or equal to 2;
 distributing, by the management node, the k shares of data to the first layer of computation nodes as sub-nodes thereof, each of the first layer of computation nodes obtain at least one share of data therein;
 distributing, by each of the computation nodes, at least one share of data distributed by a parent node thereof to sub-computation nodes thereof; and
 requesting, by each of the computation nodes, the remaining specified data to other computation nodes, to thereby obtain all the specified data.

According to another aspect of the present invention, a system for distributing specified data in a High-Performance Computing cluster is provided, the High-Performance Computing cluster comprising a management node and M computation nodes where M is an integer greater than or equal to 2, the management node distributing the specified data to the M computation nodes, wherein the M computation nodes in the system are divided into m layers where m is an integer greater than or equal to 2, and the specified data is divided into k shares where k is an integer greater than or equal to 2, the system comprising:

a management node distributor for, distributing, by the Management node, the k shares of data to the first layer of computation nodes as sub-nodes thereof, each of the first layer of computation nodes obtain at least one share of data therein;

a plurality of computation node distributors disposed at the plurality of computation nodes for, distributing, by the plurality of computation nodes, the at least one share of data distributed by a parent node thereof to sub-computation nodes thereof; and a plurality of data requesters disposed at the plurality of computation nodes for, requesting, by the plurality of computation nodes, the remaining specified data to other computation nodes, to thereby obtain all the specified data.

By use of the method according to the invention, data can be rapidly distributed to the computation nodes in the High-Performance Computing cluster, and the distribution time is greatly reduced comparing the prior art.

BRIEF DESCRIPTION OF THE DRAWINGS

The above and other objects, features and advantages of the invention become more apparent through detailed descriptions of the embodiments shown in the accompanying drawings of the invention, wherein like reference numerals generally represent like parts in the embodiments of the invention.

DETAILED DESCRIPTION OF THE PREFERRED EMBODIMENT

Figure 1:
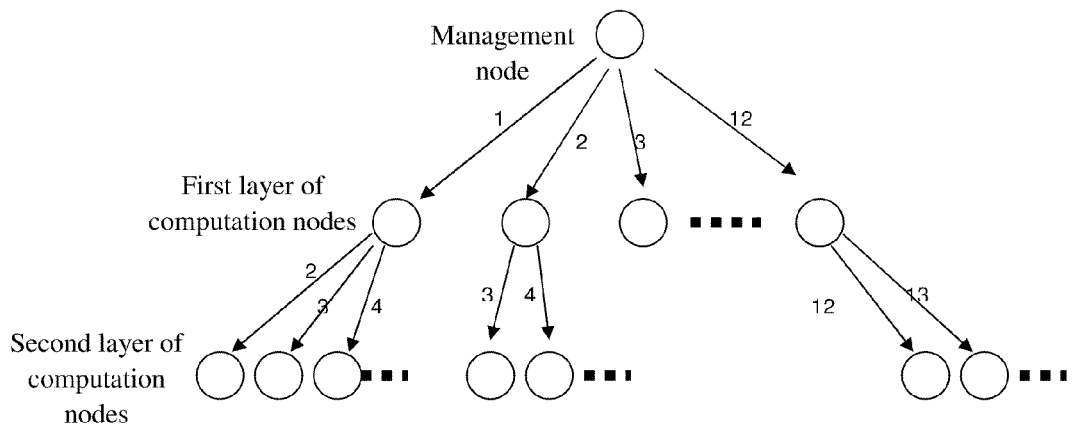
FIG. 1 is a schematic diagram showing data distribution in the prior art in a High-Performance Computing cluster.

The preferred embodiments of the invention will be described in more detail with reference now to the accompanying drawings in which preferred embodiments of the invention are shown. However, the invention can be implemented in many forms and shall not be regarded as being restricted by the embodiments set forth herein. In contrast, the embodiments are provided for making the invention more thorough and complete, and conveying the scope of the invention comprehensively to those skilled in the art.

Since the High-Performance Computing cluster includes too many nodes and a job operated in the cluster generally uses most or all of the nodes included in the cluster, a network connection table that contains connection information of all the nodes involved in the operation of the job generally is too large, e.g. 50 M bytes given in the Background Art. Such a large network connection table needs a long time to be transmitted; for the High-Performance Computing cluster, there are a lot of jobs to be operated, and each job has to transmit the network connection table of the job; therefore, as a whole, the transmission time of the network connection table cannot be ignored, especially for a cluster that frequently dispatches jobs, reducing the transmission time of the network connection table is very necessary.

In the prior art, the computation nodes involved in all the jobs are divided into two layers, the Management node transmits the network connection table of the job to the first layer of computation nodes, and then the first layer of computation nodes transmits the network connection table of the job to the second layer of computation nodes. The whole network connection table is transmitted in this process.

A basic idea of the invention is that, the computation nodes are still divided into layers, but not the whole network connection table is transmitted, and the network connection table of the job is divided into several shares; the management node transmits one share of the network connection table in turn for each of the first layer of computation nodes, and the first layer of computation nodes transmit the received one share of network connection table to its lower layers; after a computation node receives one share of network connection table belonging to its branch, it can randomly request other computation nodes for one share of network connection table belonging to other computation node branches; in this way, a node can obtain shares of the network connection table that is divided into several shares and can combine all the shares of the network connection table to be a complete network connection table of the job and reports to the management node. After the management node obtains reports from all the computation nodes, it can confirm that the network transmission table of the job has been transmitted.

It can be learned by those skilled in the art through the following description that, the data distribution method and system of the invention are not only limited to the distribution of the network connection table of the job, but also can distribute any desired data in the High-Performance Computing cluster, as long as the same data needed by all the computation nodes is distributed, which can greatly reduce the distribution time.

Figure 2:
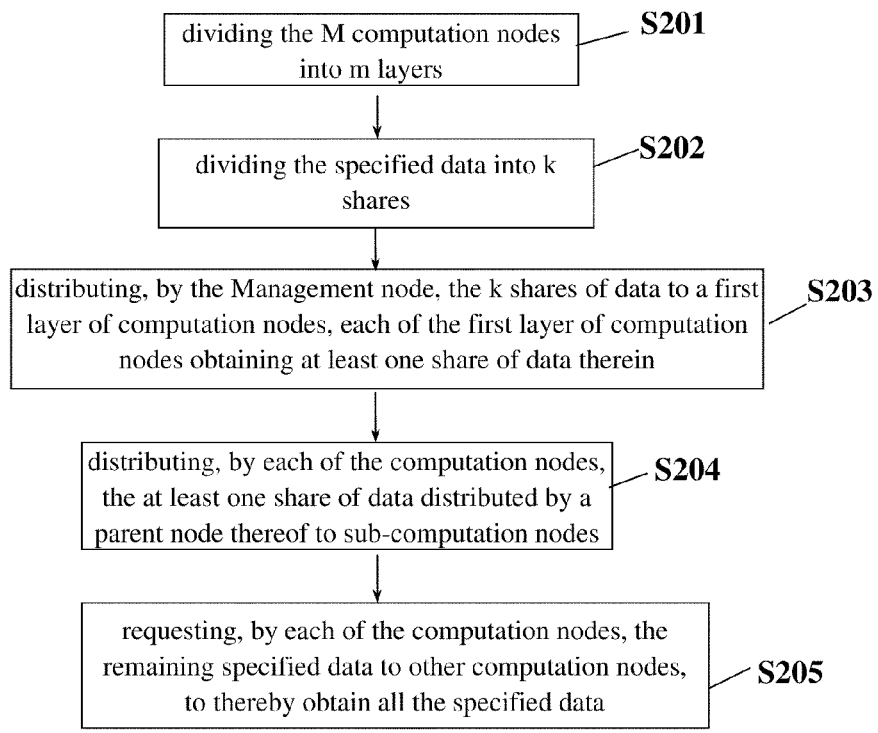
FIG. 2 illustratively shows a method for data distribution in a High-Performance Computing cluster according to the invention.

Specifically, FIG. 2 illustratively shows a method for data distribution in the High-Performance Computing cluster, the High-Performance Computing cluster comprising a management node and M computation nodes where M is an integer greater than or equal to 2, the management node distributing specified data to the M computation nodes, the method comprising:

A step S201 of dividing the M computation nodes into m layers where m is an integer greater than or equal to 2;

A step S202 of dividing the specified data into k shares where k is an integer greater than or equal to 2;

A step S203 of distributing, by the management node, k shares of data to the first layer of computation nodes as sub-nodes thereof, each of the first layer of computation nodes obtaining at least one share of data therein;

A step S204 of distributing, by each of the computation nodes, the at least one share of data distributed by a parent node thereof to sub-computation nodes thereof; and A step S205 of requesting, by each of the computation nodes, the remaining specified data to other computation nodes, to thereby obtain all the specified data.

The steps in FIG. 2 are described in detail below.

At step S201, the M computation nodes are divided into m layers where m is an integer greater than or equal to 2. It is assumed that, the number of the first layer of computation nodes is $n_1$, the number of the second layer of computation nodes is $n_2$, . . . , the number of the m-th layer of computation nodes is $n_m$, then $n_1+n_2+ \ldots +n_m=M$. Thus all the nodes can be regarded as a tree structure, wherein the management node is a root of the tree, and each of the first layer of computation nodes and layers of sub-nodes thereof constitute a branch of the tree. Here, the tree constituted by the computation nodes may be divided into a plurality of layers, but the computing of the plurality of layers will be relatively complex, and the time of delivery from the management node to the sub-nodes becomes longer. Therefore, according to a preferred embodiment of the invention, m=2, that is to say, the computation nodes are only divided into two layers, and the number of sub-nodes of each of the first layer of computation nodes can be arbitrarily set, for example, the number of sub-nodes of each of the first layer of computation nodes may be identical or different from each other; if the number is different from each other, the subsequent processing will be more complex. Therefore, according to a preferred embodiment of the invention, the number of sub-nodes of each of the first layer of computation nodes is identical.

At step S202, the specified data are divided into k shares where k is an integer greater than or equal to 2. Here, the specified data may be divided into k shares with unequal sizes or k shares with equal size. The two can be processed similarly. However, if the specified data is divided into k shares with equal size, since the transmission time is more easily evaluated, in a preferred embodiment of the invention, the specified data is divided into k shares with equal size.

At step S203, the management node distributes the k shares of data to the first layer of computation nodes as sub-nodes thereof, each of the first layer of computation nodes obtaining at least one share of data therein. In this way, the first layer of computation nodes obtain one or more shares of data in the branch thereof. Preferably, the management node further distributes to the first layer of computation nodes a distribution start time, the tree structure of all the computation nodes, and a size of each share of the specified data, such that all the computation nodes know the distribution start time, the tree structure of all the computation nodes, and the size of each share of the specified data, for the convenience of the subsequent data processing. When the number $n_1$ of the first layer of computation nodes is greater than k, the management node may distribute one share of data for each of the first k computation nodes; for the remaining computation nodes, the management node may distribute to each computation node one share of data from the beginning of the first share of data again; or, for the remaining computation nodes, several shares of data may be selected for transmission; in another embodiment, several shares of data may be transmitted to each computation node, in manner of cyclic transmission, and so on. In a preferred embodiment, $n_1=k$, that is to say, the number of the first layer of computation nodes is identical with the number of shares that the specified data is divided, in this way, the management node can in turn distribute each share of data to each of the first layer of computation nodes, and each computation node obtains just one share of data. If the number of sub-nodes of each of the first layer of computation nodes is also made identical, and the number of the first layer of computation nodes is equal to k, this distributing process will be easier. In a further preferred embodiment, not only the number of the first layer of computation nodes is identical with the number of the shares of the specified data, but also the number of sub-nodes of each of the first layer of computation nodes is identical. For sake of simplicity, this preferred embodiment is often used below for comparison.

At step S204, the computation node distributes the at least one share of data distributed by a parent node thereof to sub-nodes thereof, then the computation nodes each obtain at least a share of data of the branch thereof. Preferably, the computation nodes further transmit to sub-nodes thereof the distribution start time, the tree structure of all the computation nodes, and the size of each share of the specified data, such that all the computation nodes obtain the tree structure of all the computation nodes, and the size of each share of the specified data, for the convenience of subsequent data transmission. Although data in the sub-task is delivered through Infiniband in High-Performance Computing operation, the control information of the node is delivered through the TCPIP protocol. Thus each node, during the broadcast, need to know the structure of the tree and an IP address of each node in the tree, i.e. the above-described tree structure of all the computation nodes. The structure of the tree may be expressed differently, for example, [m1, m2, m3] represents a tree having m2 branches, m3 layers and in total m1 nodes. The IP address information of each node is saved continuously, e.g. for a two-layered tree, in the IP information table, a j1-th sub-node of an i1-th node in the first layer (i1, j1 both start from 0) has an indexed position of i1*m2+j1. There are 16 k nodes at most, so the information table for all the IP addresses is 64 KB. The data and the tree structure data will be distributed to each node at the beginning of the broadcast. It can be seen that, an information amount of the tree structure of all the nodes is far less than an information amount of the network connection table.

In a preferred embodiment, when the computation nodes are divided into two layers, the first layer of computation nodes transmit to sub-nodes thereof one or more shares of data obtained from the management node. In a further preferred embodiment, the number of the first layer of computation nodes is identical with the number of the shares of the specified data, and when the number of sub-nodes of the first layer of computation nodes is identical, the step S204 is that, the first layer of computation nodes transmit to sub-nodes thereof one share of data obtained from the management node.

Figure 3:
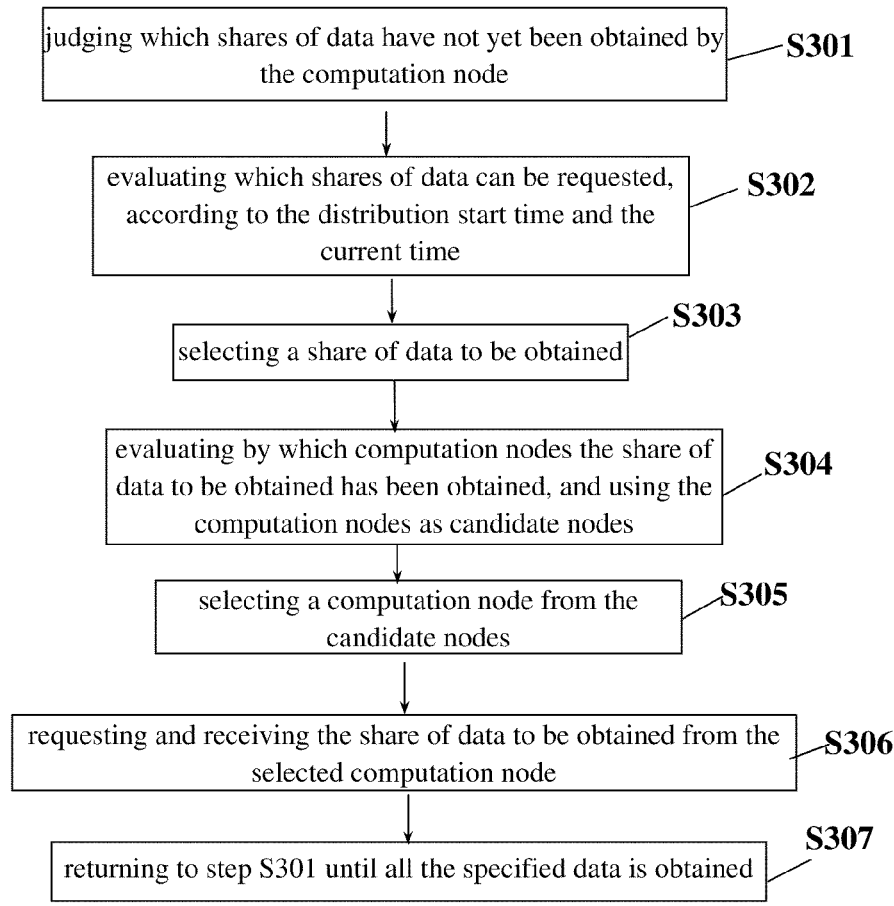
FIG. 3 illustratively shows a process regarding how a computation node obtains the remaining specified data according to an embodiment of the invention.

At step S205, the computation nodes request the remaining specified data to other computation nodes, to thereby obtain all the specified data. In a preferred embodiment, each computation node has obtained the distribution start time, the tree structure of all the computation nodes, and the size of each share of the specified data, and thus they can evaluate the data transmission time in the steps S203 and S204 according to the network bandwidth, and computes which computation nodes at present have which shares of data. Specifically, for a computation node, the computation node has obtained a share of data of the branch where it is located. FIG. 3 illustratively shows a process regarding how a computation node obtains the remaining specified data according to an embodiment of the invention. According to FIG. 3, the method comprises:

A step S301 of judging which shares of data have not yet been obtained by the computation node;

A step S302 of evaluating which shares of data in the data not yet obtained can be requested, according to the distribution start time and the current time;

A step S303 of selecting a share of data to be obtained from the data that can be requested;

A step S304 of determining by which computation nodes the share of data to be obtained has been obtained, and using the computation nodes as candidate nodes. In a preferred embodiment, all the computation nodes are divided into two layers, and the specified data is divided into k shares with equal size; it is assumed that, each share has a size of s bits, the number of the first layer of computation nodes is identical with the number of shares of the specified data, and the number of sub-nodes of each of the first layer of computation nodes is identical, e.g. h; if the network bandwidth is g, then during a period of time of 0-ks/g after the distribution start time, the management node distributes data to the first layer of computation nodes; at the moment of s/g seconds after the start of the distribution of the management node, the first computation node in the first layer starts distributing to sub-nodes thereof the one share of data obtained thereby. At the moment of i*s/g after the start of the distribution of the management node, the i-th computation node in the first layer obtains the first share of data belonging to the branch thereof, and then starts distributing to sub-nodes thereof the share of data at one time. That is to say, each computation node can evaluate which computation nodes have the data that is distributed to the branch by the management node after a period of time, according to the obtained distribution start time, the tree structure of all the computation nodes, the size of each share of the specified data, and the network bandwidth. During distribution, the first layer of computation nodes can at the same time receive data requests from computation nodes of other branches, and transmit the data requests to the computation nodes of other branches, preferably, the first layer of computation nodes only distribute data to the sub-nodes thereof, do not receive data requests from the computation nodes of other branches and do not transmit the data request to the computation nodes of other branches, until the data of the computation nodes of the branch itself has been distributed, and only after that, it can receive data requests from the computation nodes of other branches and transmit the data requests to the computation nodes of other branches. For a multi-layered tree structure, preferably, a computation node of any intermediate layer has the above characteristic, thus the time required for transmitting data to the overall network is more easily evaluated and the transmission efficiency will be higher. Furthermore, for each of the second layer of computation nodes, it can transmit a data request to the computation nodes of other branches before receiving the data of the branch to which the node belongs, and can receive the data request from the computation nodes of other branches after receiving the data of the branch to which the node belongs. Preferably, each of the second layer of computation nodes can receive data requests from the computation nodes of other branches and transmit the data request to the computation nodes of other branches, only after it receives the data of the branch to which the computation node belongs. For a multi-layered tree structure, preferably, a computation node of any intermediate layer has the above characteristic, thus the time required for obtaining the data of the branch by each computation node is more easily evaluated and the transmission efficiency will be higher. As for the above-described embodiments, it can be learned that, for the i-th node in the first layer, the time required for obtaining the first share of data by the j-th sub-node is about (i+j)*s/g seconds after the start of the overall distribution process. Each of the computation nodes can evaluate which shares of data can be requested and which computation nodes have obtained the share of data of the branch to which the computation node corresponds, according to a difference between the current time and the distribution start time, and the distribution times of the computation nodes. In this way, for the selected share of data to be obtained, it can be determined by which computation nodes the share of data has been obtained.

A step S305 of selecting a computation node from the candidate nodes. In the step of selecting, a preferred embodiment is: selecting the computation node by means of random selection such that the load of the whole High-Performance Computing cluster becomes more balanced. Of course, those skilled in the art would appreciate that, other means may be adopted, e.g. numbering the computation nodes, selecting intermediately numbered computation nodes, selecting a maximally numbered computation node, and so on.

A step S306 of requesting and receiving a share of data to be obtained from the selected computation node. The data of the branch obtained by the computation nodes are evaluated according to information such as the distribution start time, the tree structure of all the computation nodes, the size of each share of the specified data, and the network bandwidth. Many unexpected situations often occur in the network, e.g. reduced bandwidth due to network congestion, so the evaluation sometimes will be not enough correct. At this time, if a request is issued to a computation node that has the data that is distributed to the branch by the management node after an evaluated period of time, a response that the share of data does not exist will be received. Then, a correction is made to the evaluated period of time after which the computation node has the data that was distributed to the branch by the management node, and it is deemed that the distribution state of the whole tree evaluated by the node sometimes moves ahead. After the correction is made, the node will delay the forecast of the overall distribution process to a certain degree to avoid failure of the subsequent requests again.

A step S307 of returning to step S301 until all the specified data is obtained.

Figure 4:
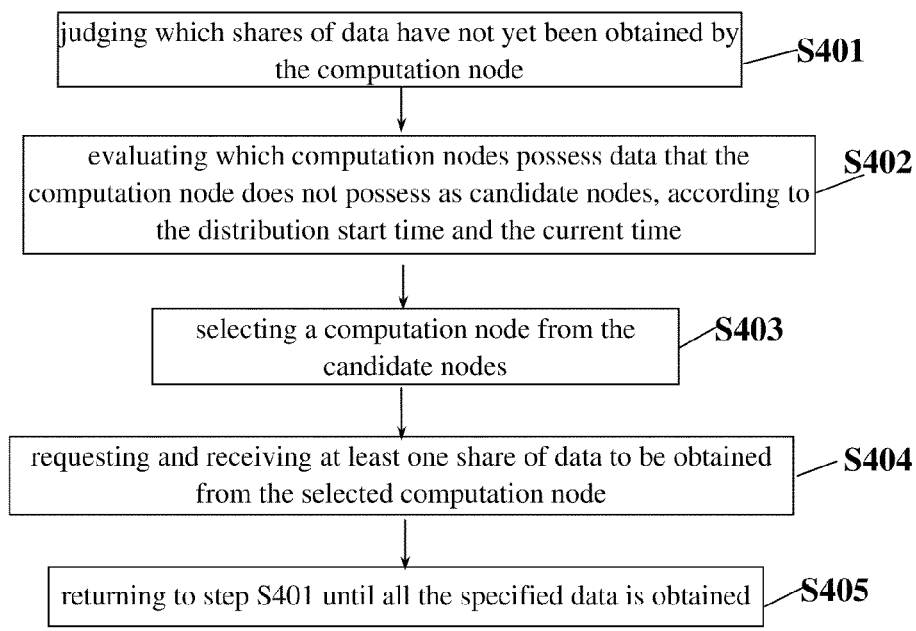
FIG. 4 illustratively shows a process regarding how a computation node obtains the remaining specified data according to another embodiment of the invention.

FIG. 4 illustratively shows a process regarding how a computation node obtains the remaining specified data according to another embodiment of the invention. According to FIG. 4, at a step S401, it is judged which shares of data have not yet been obtained by the computation node; here, one or more share of data may be not obtained by the computation node. At a step S402, it is evaluated which nodes possess data segments that the computation node does not possess as candidate nodes, according to the distribution start time and the current time; here, the way of evaluating is similar to that in FIG. 3, and a correspondence between the share of data and the node is obtained. At a step S403, a computation node is selected from the candidate nodes. Differently from FIG. 3, the way in FIG. 3 is to select a computation node from the share of data, whereas in the present embodiment, a computation node is directly selected to obtain the share of data on the computation node. The process further comprises: a step S404 of requesting and receiving at least one share of data to be obtained from the selected computation node, and a step S405 of returning to the step of judging until all the specified data is obtained. The present embodiment, similar to the embodiment in FIG. 3, also has the problem of correction and thus has the same solution.

In the step of selecting a computation node from the candidate nodes, a preferred embodiment is: selecting the computation node by means of random selection such that the load of the whole High-Performance Computing cluster becomes more balanced. Of course, those skilled in the art would appreciate that, other means may be adopted, e.g. numbering the computation nodes, selecting intermediately numbered computation nodes, selecting a maximally numbered computation node, and so on.

Figure 5:
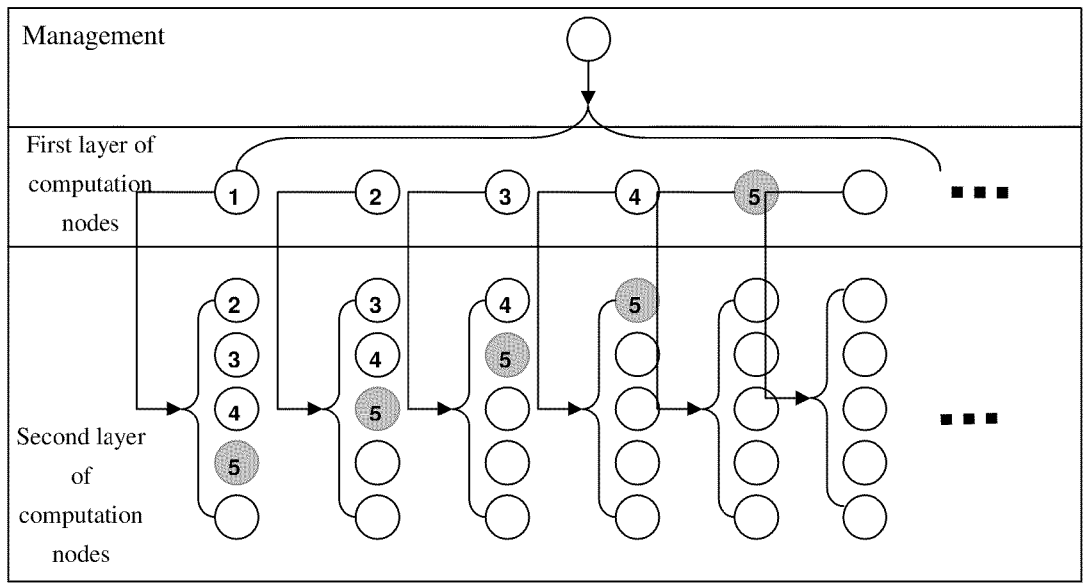
FIG. 5 illustratively shows node transmission according to a preferred embodiment of the invention.

FIG. 5 illustratively shows node transmission according to the above preferred embodiments. In FIG. 5, a number on each computation node refers to the moment when the computation node receives the first share of data. A serial number [i, j] may be used for representing a position of each computation node in the tree, where i represents an i-th branch where the node is located, and j represents a j-th sub-node of the parent node the computation node is. It is assumed that, there are k computation nodes in the first layer where i<k and i is a non-negative integer; it is assumed that there are 5 sub-nodes in the second layer for each of the first layer of computation nodes. As shown in FIG. 5, serial numbers of the second layer of sub-nodes of each of the first layer of computation nodes [i, 0] are [i, 1], [i, 2], [i, 3], [i, 4], [i, 5], respectively. According to the above preferred embodiments, after the computation node [3, 2] receives the data that was distributed to the computation nodes of the branch, it refers to the moment data on the number of the node. It can be seen that, the computation nodes [1, 1], [1, 2], [1, 3], [1, 4], [2, 1], [2, 2] and [2, 3] have received the data that was distributed to the computation nodes of the branch, then the computation node [3, 2] can request the first share of the specified data to one of the computation nodes [1, 0], [1, 1], [1, 2], [1, 3], [1, 4], or request the second share of the specified data to one of the computation nodes [2, 0], [2, 1], [2, 2], [2, 3], and so on. However, for other computation nodes, the computation node [3, 2] can evaluate that other nodes do not obtain a share of data of the branch and thus do not issue a data request to them.

Through the above steps, the computation node can obtain every share of all the specified data and then combine the shares of data into a complete specified data. By use of the method of the invention, all the computation nodes can obtain all the specified data in a shorter time, which reduces a period of time during which the specified data goes throughout all the computation nodes of the High-Performance Computing cluster.

Then, each time a computation node obtains the complete specified data, it reports to the management node; when all the computation nodes finish reporting, the management node can instruct the computation nodes in the High-Performance Computing cluster to perform further operations.

Figure 6:
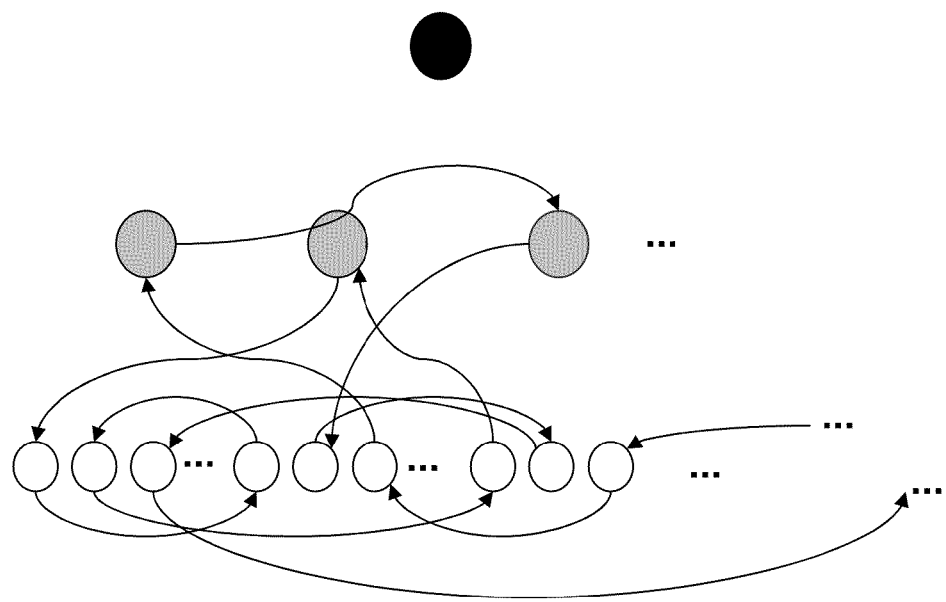
FIG. 6 illustratively shows data transmission between the nodes at a particular moment according to a preferred embodiment of the invention.

FIG. 6 illustratively shows data transmission between the nodes at a particular moment, according to the preferred embodiments of the invention.

The data transmission time according to the method of the invention is evaluated below: it is assumed that, the number of the first layer of computation nodes is 128, the number of sub-nodes of each of the first layer of computation nodes is also 128, the data is divided into 128 shares, and the size of each share of the data is 50 MB/128; the moment when the last node of the second layer, i.e. the last sub-node of the last node of the first layer, receives the first share of data that the parent node thereof distributes to it is 50 MB/128*(128+128)/(10 G/8)=10/128=0.078 seconds after the beginning of the overall distribution process, wherein the size of one share of data is 50 MB/128. The management node distributes each share of data to the first layer of nodes at a time, and the time required for distributing the data to one node is 50 MB/128/(10 G/8); the moment when the last node of the first layer receives the first share of data is 50 MB/128/(10 G/8)*128 after the beginning of the distribution; then the last node of the first layer distributes the one share of data that it receives to its 128 sub-nodes. The moment when the last sub-node receives the first share of data is 50 MB/128/(10 G/8)*128+50 MB/128/(10 G/8)*128=50 MB/128*(128+128)/(10 G/8)= 10/128=0.078 seconds. After the last sub-node of the last node of the first layer receives its first share of data, it needs to request the remaining 127 shares of data to other nodes. The time required for delivering the remaining 127 shares of data is: 50 MB/128*127/(10 G/8)=0.039 seconds. After the node receives all the 128 shares of data, since the node is the last node of the whole tree structure, all the other nodes should have received all the 128 shares of data, so the overall transmission time is 0.078+0.039=0.117 seconds. Apparently, the transmission method of the invention greatly reduces the transmission time of a particular data, as compared with the transmission method in the prior art.

Figure 7:
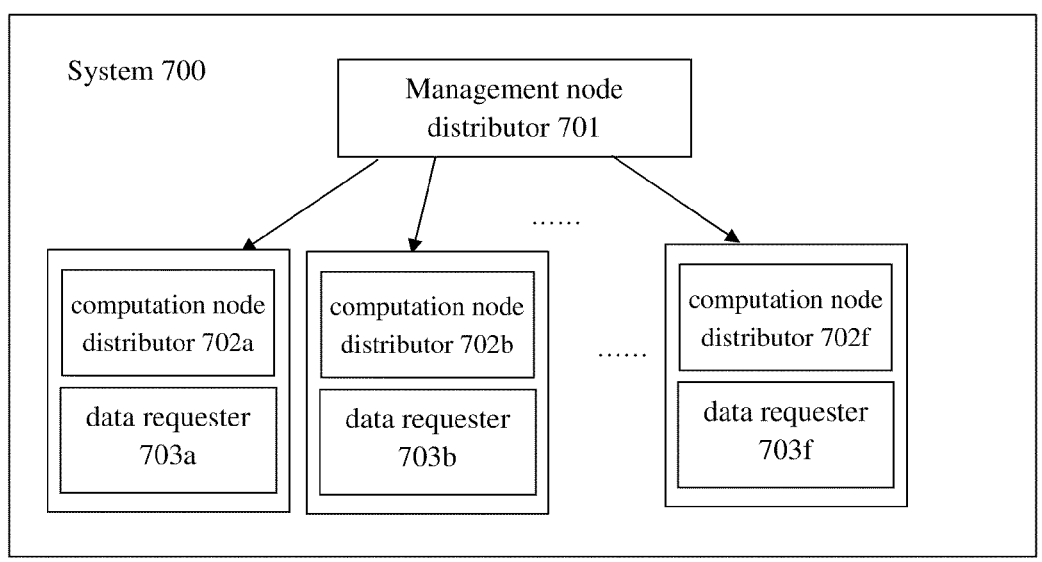
FIG. 7 is a system block diagram for illustratively showing data distribution in the High-Performance Computing cluster.

According to the same one inventive concept, the present invention further discloses a system 700 for distributing specified data in a High-Performance Computing cluster, shown in FIG. 7. According to FIG. 7, the High-Performance Computing cluster comprises a management node and M computation nodes where M is an integer greater than or equal to 2, the management node distributing the specified data to the M computation nodes, wherein the M computation nodes in the system are divided into m layers where m is an integer greater than or equal to 2, and the specified data is divided into k shares where k is an integer greater than or equal to 2, the system comprising: a management node distributor 701 for, distributing, by the management node, the k shares of data to the first layer of computation nodes as sub-nodes thereof, each of the first layer of computation nodes obtaining at least one share of data therein; a plurality of computation node distributors 702a, 702b, ..., 702f, disposed at the plurality of computation nodes for, distributing, by the plurality of computation nodes, the at least one share of data distributed by a parent node thereof to sub-computation nodes thereof; and a plurality of data requesters 703a, 703b, ..., 703g, disposed at the plurality of computation nodes for, requesting, by the computation nodes, the remaining specified data to other computation nodes, to thereby obtain all the specified data.

In a preferred embodiment, the management node distributor of the system 700 further distributes to the sub-nodes thereof the distribution start time, the tree structure of all the computation nodes, and the size of each share of the specified data, and the plurality of computation node distributors further distribute to the sub-nodes thereof the distribution start time, the tree structure of all the computation nodes, and the size of each share of the specified data.

In a further preferred embodiment, a data requestor 703 of the system 700 further comprises (not shown in FIG. 7): judging means for judging which shares of data have not yet been obtained by the computation node; first evaluating means for evaluating which shares of data in the data not yet obtained can be requested, according to the distribution start time and the current time; data selecting means for selecting a share of data to be obtained from the data that can be requested; second evaluating means for evaluating by which computation nodes the share of data to be obtained has been obtained, and using the computation nodes as candidate nodes; node selecting means for selecting a computation node from the candidate nodes; and request receiving means for requesting and receiving the share of data to be obtained from the selected computation node, wherein in the first and second evaluating means, each computation node evaluates which computation nodes possess which shares of data, according to the obtained distribution start time, the tree structure of all the computation nodes, the size of each share of the specified data, and the network bandwidth.

In a further preferred embodiment, a data requester 703 of the system 700 further comprises (not shown in FIG. 7): judging means for judging which shares of data have not yet been obtained by the computation node; third evaluating means for evaluating which computation nodes possess data that the computation node does not possess, as candidate nodes, according to the distribution start time and the current time; node selecting means for selecting a computation node from the candidate nodes; and request receiving means for requesting and receiving at least one share of data to be obtained from the selected computation node.

In node selecting means of the system 700, the selection of the computation node has many embodiments, and one preferred embodiment is random selection, wherein the first, second and third evaluating means evaluate which computation nodes possess the data that was distributed to the branch by the management node after a period of time, according to the obtained distribution start time, the tree structure of all the computation nodes, the size of each share of the specified data, and the network bandwidth. Preferably, after the request receiving means issues a request, if the requested node returns a response that the share of data does not exist, a correction is made to the evaluation, and a simple way is to make a correction to the evaluated period of time after which the computation node has the data that was distributed to the branch by the management node.

In the system 700, a preferred embodiment for the management node distributor in a tree structure constituted by the computation nodes is that, while an intermediate node distributes at least one share of data of the branch to the sub-nodes thereof, it does not receive data requests from the computation nodes of other branches and does not transmit the data request to the computation nodes of other branches, until the data of the computation nodes of the branch has been distributed, and only after that, it can receive data requests from the computation nodes of other branches and transmit the data requests to the computation nodes of other branches. Only after a computation node receives the data of the branch to which the node belongs, it receives data requests from the computation nodes of other branches and transmits the data requests to the computation nodes of other branches.

In a preferred embodiment, the system 700 further comprises a plurality of reporters disposed at the plurality of computation nodes, for reporting to the management node after each of the computation nodes have obtained the complete specified data.

In order that the system more easily evaluates that the computations nodes have obtained the data of the branch thereof and the system design is simple, the M computation nodes in the system 700 satisfy the following conditions: m=2; the number of the first layer of computation nodes equals to k; the size of the k shares of data is identical; and the number of sub-nodes of each of the first layer of computation nodes is identical.

The embodiments of the present invention have been described with reference to the accompanying drawings, but it should be appreciated that, the invention is not limited to the exact embodiments. Many modifications and variations will be apparent to those of ordinary skill in the art without departing from the scope and spirit of the invention. All these modifications and variations are intended to be included in the scope of the invention defined by the accompanied claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit", "module" or "system". Furthermore, aspects of the present invention may take the form of a computer program product embodied in one or more tangible computer readable medium(s) having computer readable program code embodied thereon.

Any combination of one or more computer readable medium(s) may be utilized. The computer readable medium may be computer readable signal medium or a computer readable storage medium. A computer readable storage medium may be, for example, but not limited to, an electronic, magnetic, optical, electromagnetic, infrared, or semiconductor system, apparatus, device or propagating medium, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPPROM or Flash memory), an optical fiber, a portable compact disc read-only memory (CD-ROM), an optical storage device, a magnetic storage device, or any suitable combination of the foregoing. In the context of this document, a computer readable storage medium or a computer usable medium may be any tangible medium that can contain, store, communicate, propagate, or transport a program for use by or in connection with an instruction execution system, apparatus, or device. A computer usable medium may include a propagated data signal with computer readable program code embodied therein, for example, in baseband or as part of a carrier wave. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, as a stand-alone software package, partly one the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Furthermore, it will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagram and/or flowchart illustration, can be implemented by special purpose hardware-based systems that perform the specified functions or acts, or combinations of special purpose hardware and computer instructions.

What is claimed is:

1. A method for distributing multiple identical copies of a specified data record in a High-Performance Computing cluster, the High-Performance Computing cluster comprising a management node and M computation nodes where M is an integer greater than or equal to 2, the management node distributing the specified data record to the M computation nodes, the method comprising:
   (a) dividing the M computation nodes into m layers where m is an integer greater than or equal to 2;
   (b) dividing the specified data record into k shares where k is an integer greater than or equal to 2, the specified data record and each of the k shares thereof having a respective predetermined size;
   (c) distributing, by the management node, the k shares of the specified data record to a first layer of computation nodes as sub-nodes thereof, each computation node of the first layer of computation nodes obtaining at least one respective share of the k shares of the specified data record therein from the management node, each computation node of the first layer of computation nodes being a root node of a respective branch of said M computation nodes;
   (d) distributing, by at least one respective computation node within each said branch of the M computation nodes, the at least one respective share of the k shares of the specified data record distributed by the management node to the root node of the respective branch and received by the respective computation node from a parent node thereof, to each sub-node of the respective computation node;
   (e) determining, by each of the M computation nodes, the respective remaining shares of the k shares of the specified data record not received by the respective computation node from said (c) and said (d), and for each respective remaining share, determining at least one respective source computation node having a copy of the respective remaining share, each source computation node being located within a respective branch of said M computation nodes other than the branch of said M computation nodes containing the respective computation node; and
   (f) responsive to (e), requesting, by each of the M computation nodes, each of the respective remaining shares of the k shares of the specified data record not received by the respective computation node from said (c) and said (d) in a respective plurality of requests issued by the requesting computation node, each request of each respective plurality of requests issued by the requesting computation node being made to a respective source computation node of said M computation nodes as determined by said (e), and responsive thereto, receiving in each of the requesting computation nodes the respective remaining shares of the k shares of the specified data record requested by the respective requesting computation node, to thereby obtain in each computation node a complete copy of all the specified data record.

2. The method of claim 1, wherein distributing, by the management node, the k shares of the specified data record to the first layer of computation nodes as sub-nodes thereof further comprises: distributing, by the management node, a distribution start time, a tree structure of all the M computation nodes, and a size of each share of the specified data record to each node of the first layer of computation nodes as sub-nodes thereof, and distributing, by at least one respective computation node within each said branch of the M computation nodes, the at least one respective share of the k shares of the specified data record distributed by the management node to the root node of the respective branch and received by the respective computation node from the parent node thereof, to each sub-node of the respective computation node, further comprises: distributing, by each of the at least one respective computation node within each said branch of the M computation nodes, the distribution start time, the tree structure of all the M computation nodes, and the size of each share of the specified data record to each sub-node thereof.

3. The method of claim 2, wherein in said (e) and (f), acts executed by each respective requesting computation node comprise:
   judging which shares of the k shares of the specified data record have not yet been obtained by the requesting computation node;
   evaluating which shares of the k shares of the specified data record in the data not yet obtained can be requested, according to the distribution start time and the current time;
   selecting a share of the k shares of the specified data record to be obtained from the shares of the specified data record that can be requested;
   evaluating which computation nodes have obtained the selected share of data to be obtained, and using the computation nodes which have obtained the selected share of data as candidate nodes;
   selecting a computation node from among the candidate nodes; and
   requesting and receiving the selected share of data to be obtained from the selected computation node.

4. The method of claim 2, wherein in said (e) and (f), acts executed by each respective requesting computation node comprise:

judging which shares of the k shares of the specified data record have not yet been obtained by the requesting computation node;
evaluating which computation nodes possess at least one share of the specified data record that the computation node does not possess as candidate nodes, according to the distribution start time and the current time;
selecting a computation node from among the candidate nodes; and
requesting and receiving at least one share of data to be obtained from the selected computation node.

5. The method of claim 3, wherein in the act of selecting a computation node from among the candidate nodes, the computation node is randomly selected from the among candidate nodes.

6. The method of claim 3, wherein the evaluating acts are executed by each of the computation nodes according to the obtained distribution start time, the tree structure of all the computation nodes, the size of each share of the specified data and the network bandwidth.

7. The method of claim 4, wherein in the act of selecting a computation node from among the candidate nodes, the computation node is randomly selected from among the candidate nodes.

8. The method of claim 4, wherein the evaluating acts are executed by each of the computation nodes according to the obtained distribution start time, the tree structure of all the computation nodes, the size of each share of the specified data and the network bandwidth.

9. The method of claim 6, wherein after requesting and receiving the share of data to be obtained from the selected computation node, if the requested node returns a response that the share of data does not exist, a correction is made to results of the evaluating acts.

10. The method of claim 8, wherein after requesting and receiving the share of data to be obtained from the selected computation node, if the requested node returns a response that the share of data does not exist, a correction is made to results of the evaluating acts.

11. The method of claim 1, wherein, in a tree structure constituted by the computation nodes, while an intermediate node distributes one or more share of data of the branch to each sub-node thereof, it does not receive data requests from the computation nodes of other branches and does not transmit the data requests to the computation nodes of other branches, until the data of the computation nodes of the branch has been distributed, and only after that, it can receive data requests from the computation nodes of other branches and transmit the data requests to the computation nodes of other branches.

12. The method of claim 11, wherein only after a computation node of the M computation nodes receives the data of the branch to which the node belongs, it receives data requests from the computation nodes of other branches and transmits the data requests to the computation nodes of other branches.

13. The method of claim 1, wherein the M computation nodes satisfy the following conditions:
(1) m=2;
(2) the number of the first layer of computation nodes equals to k;
(3) the size of the k shares of data is identical; and
(4) the number of sub-nodes of each of the first layer of computation nodes is identical.

14. A system for distributing multiple identical copies of a specified data record in a High-Performance Computing cluster, the High-Performance Computing cluster comprising a management node and M computation nodes where M is an integer greater than or equal to 2, the management node distributing the specified data record to the M computation nodes, wherein the M computation nodes in the system are divided into m layers where m is an integer greater than or equal to 2, the system comprising:
a management node distributor within the management node, the management node distributor dividing the specified data record into k shares, where k is an integer greater than one, the specified data record and each of the k shares thereof having a respective predetermined size, the management node distributor further distributing, from the management node directly to a first layer of computation nodes as sub-nodes of the management node, the k shares of the specified data record, each computation node of the first layer of computation nodes obtaining at least one respective share of the k shares of the specified data record therein from the management node, each computation node of the first layer of computation nodes being a root node of a respective branch of said M computation nodes;
a plurality of computation node distributors, each computation node distributor located within a respective computation node, each computation node distributor distributing, from the respective computation node in which it is located directly to each sub-node of the respective computation node, the at least one respective share of the k shares of the specified data record distributed by the management node to the root node of the respective branch and received by the respective computation node from a parent node thereof; and
a plurality of data requesters, each data requester located within a respective computation node, each data requester determining the respective remaining shares of the k shares of the specified data record not received by the respective computation node from the parent node thereof, and for each respective remaining share, determining at least one respective source computation node having a copy of the respective remaining share, each source computation node being located within a respective branch of said M computation nodes other than the branch of said M computation nodes containing the respective computation node, each data requester further requesting, by the respective computation node in which it is located, each of the remaining shares of the k shares of the specified data record not received by the respective computation node from the parent node thereof in a respective m plurality of requests, each request being made to a respective source computation node of said M computation nodes as determined by the respective data requester, and responsive thereto, receiving in the respective requesting computation node the respective remaining shares of the k shares of the specified data record requested by the respective requesting computation node, to thereby obtain in each computation node a complete copy of all the specified data record.

15. The system of claim 14, wherein the management node distributor further distributes a distribution start time, a tree structure of all the M computation nodes, and a size of each share of the specified data record to each node of the first layer of computation nodes as sub-nodes thereof, and each of the computation node distributors further distributes, from the respective computation node in which it is located directly to each sub-node of the respective computation node, the distribution start time, the tree structure of all the M computation nodes, and the size of each share of the specified data record.

16. The system of claim 15, wherein each data requester further:

judges which shares of the k shares of the specified data record have not yet been obtained by the computation node in which the respective data requester is located;

evaluates which shares of the k shares of the specified data record in the data not yet obtained can be requested, according to the distribution start time and the current time;

selects a share of the k shares of the specified data record to be obtained from the shares of the specified data record that can be requested;

evaluates which computation nodes have obtained the selected share of data to be obtained, and uses the computation nodes which have obtained the selected share of data as candidate nodes;

selects a computation node from among the candidate nodes; and requests and receives the selected share of data to be obtained from the selected computation node.

17. The system of claim 15, wherein each data requester further:

judges which shares of the k shares of the specified data record have not yet been obtained by the computation node in which the respective data requester is located;

evaluates which computation nodes possess at least one share of the specified data record that the computation node in which the respective data requester is located does not possess as candidate nodes, according to the distribution start time and the current time;

selects a computation node from among the candidate nodes; and requests and receives at least one share of data to be obtained from the selected computation node.

18. The system of claim 16, wherein in the data requester, the computation node is randomly selected from among the candidate nodes.

19. The system of claim 16, wherein the data requester evaluates which shares of the k shares of the specified data record in the data not yet obtained can be requested, and evaluates which computation nodes have obtained the selected share of data to be obtained, according to the obtained distribution start time, the tree structure of all the computation nodes, the size of each share of the specified data, and the network bandwidth.

20. The system of claim 17, wherein in the data requester, the computation node is randomly selected from among the candidate nodes.

21. The system of claim 17, wherein the data requester evaluates which computation nodes possess at least one share of the specified data record that the computation node in which the respective data requester is located does not possess as candidate nodes according to the obtained distribution start time, the tree structure of all the computation nodes, the size of each share of the specified data, and the network bandwidth.

22. The system of claim 19, wherein after the data requester issues a request, if the requested node returns a response that the share of data does not exist, a correction is made to evaluation results by the data requester.

23. The system of claim 21, wherein after the data requester issues a request, if the requested node returns a response that the share of data does not exist, a correction is made to evaluation results by the data requester.

24. The system of claim 14, wherein, in a tree structure constituted by the computation nodes, while an intermediate node distributes one or more share of data of the branch to each sub-node thereof, it does not receive data requests from the computation nodes of other branches and does not transmit the data requests to the computation nodes of other branches, until the data of the computation nodes of the branch has been distributed, and only after that, it can receive data requests from the computation nodes of other branches and transmit the data requests to the computation nodes of other branches.

25. The system of claim 24, wherein only after a computation node of the M computation nodes receives the data of the branch to which the node belongs, it receives data requests from the computation nodes of other branches and transmits the data requests to the computation nodes of other branches.

26. The system of claim 14, wherein the M computation nodes satisfy the following conditions:
(1) m=2;
(2) the number of the first layer of computation nodes equals to k;
(3) the size of the k shares of data is identical; and
(4) the number of sub-nodes of each of the first layer of computation nodes is identical.

* * * * *